Figure 1:
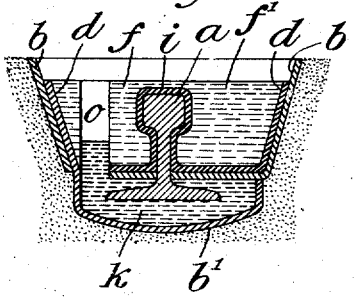

H. GOLDSCHMIDT.

PROCESS OF JOINING METAL PIECES.

APPLICATION FILED MAY 7, 1906.

Reissued Dec. 7, 1909.

13,050.

2 SHEETS—SHEET 1.

Witnesses
Chas. F. Clagett
Mary E. Stanton

Inventor
Hans Goldschmidt
By his attorney
Chas. F. Dawe

H. GOLDSCHMIDT.

PROCESS OF JOINING METAL PIECES.

APPLICATION FILED MAY 7, 1906.

Reissued Dec. 7, 1909.

13,050.

2 SHEETS—SHEET 2.

Witnesses
Chas. J. Clagett
Mary E. Stanton.

Inventor
Hans Goldschmidt
By his Attorney
Chas. F. Dawe

UNITED STATES PATENT OFFICE.

HANS GOLDSCHMIDT, OF ESSEN-ON-THE-RUHR, GERMANY, ASSIGNOR, BY DIRECT AND MESNE ASSIGNMENTS, TO GOLDSCHMIDT THERMIT CO., OF NEW YORK, N. Y., A CORPORATION OF NEW YORK.

PROCESS OF JOINING METAL PIECES.

13,050. Specification of Reissued Letters Patent. Reissued Dec. 7, 1909.

Original No. 717,840, dated January 6, 1903, Serial No. 65,192. Application for reissue filed May 7, 1906. Serial No. 315,686.

*To all whom it may concern:*

Be it known that I, HANS GOLDSCHMIDT, a subject of the King of Prussia, German Emperor, and a resident of Essen-on-the-Ruhr, Germany, have invented a new and Improved Process of Joining Metal Pieces, of which the following is an exact specification.

My invention relates to a new and improved process for joining metal pieces. In the processes known up to date for joining metal pieces by welding the same with the aid of the heat produced by the chemical reaction between aluminium and oxids of metals or other oxygen-containing metal compounds (especially oxid of iron) the reaction mass is used only as calorifying agent and the metal produced by the reaction serves only as a heat-conductor. Therefore in these alumino-thermo processes care was taken that the molten alumina-slag at first came in contact with the pieces to be welded and only after the same had formed a protecting-coating around the pieces the molten metal was flowed around the welding-pieces. In most cases these two steps of the process were carried out by merely pouring the mass resulting from the reaction out of the crucible or melting-pot, whereupon the alumina floating on top would of course flow out first, and the heavier molten metal would flow out afterward. Thus direct contact of the molten metal with the metal pieces to be welded was avoided, as was union of the molten metal with such metal pieces.

By my new process it is attained that the molten metal comes directly in contact with the welding-pieces, so that the metal may partly join with the pieces, thereby strengthening the joints, whereafter the whole reaction mass begins its operation as calorifying agent for the welding process.

The process shall be described, for example, as used for joining rails or the like.

The joining faces of the rails are at first surrounded with a suitable mold manufactured of sheet-iron, clay, or the like, after which a crucible provided with a tap-hole is placed over this mold in such a way that the stream of the molten mass flowing out of this hole does not directly flow upon the rails, but flows into the space between the rails and the wall of the mold. Then this crucible after closing the tap-hole is filled with the reaction mixture—for instance, a mixture of aluminium and oxid of iron—after which the reaction is introduced. Once the reaction is in progress further quantities of the mixture may be added. When the whole mass is in reaction, the tap-hole is opened, so that at first the molten highly-overheated iron, and afterward the molten alumina floating above the iron, flows into the mold. The iron forms a layer around the lower flange of the rails and effects the joining of the touching faces on this lower part. The alumina flowing out after the iron has a double effect upon the pieces to be joined. First, the heating attained by the same may effect the welding of the joining faces; secondly, the heating of the upper part of the rails prevents the bending up of the rails near the joining faces, which bending up it has been attempted to avoid in similar processes by holding the joining faces down by means of clamps and the like.

The tap-hole of the crucible may be closed by means of a clay plug or the like, or the hole may be covered with a metal sheet, (sheet-iron,) or the like before filling the crucible with the mixture. In this case the molten iron as soon as the reaction has come to the bottom of the crucible will melt this covering, whereby the tap-hole will be opened automatically.

In order to make my invention more clear, I will proceed to illustrate the process by an example described in connection with the accompanying drawings, in which similar characters denote similar parts, and in which—

Figure 2:
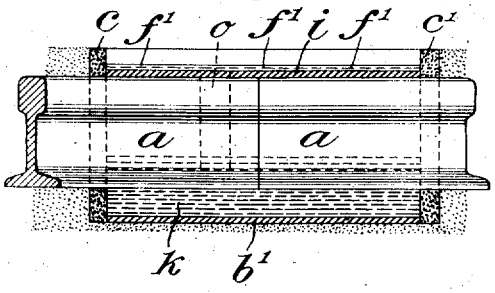
Figure 3:
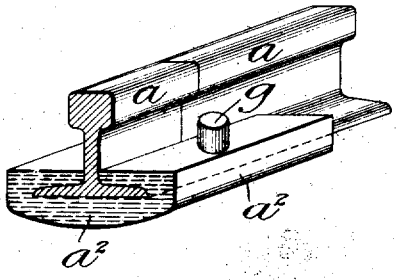

Figure 1 shows a section through one of the two rails to be joined and the mold. Fig. 2 is a side view of the rails. Fig. 3 is a perspective view of the joint. Figs. 4, 5, 6, 7, 8, 9, and 10 are modified forms of arrangements for carrying the process into effect.

In Figs. 1 and 2, *a a* are the rails to be joined. *b b′* are sheet-iron molds, the upper one of which consists of two parts surrounding the rails near the joining faces. The side walls *c c′* of these molds may advantageously be formed of sand or wet clay. By the special construction of the molds three hollow spaces *f f′ k* are formed, in which the molten mass is cast.

The process is carried out in the following manner: The metal pieces are pressed against each other in such a manner that a displacement during the heating of the pieces by means of the reaction mass is rendered impossible. Then a crucible is filled with a mixture of aluminium and oxid of iron, both in pulverized form, whereafter the mixture is ignited. It is advantageous to fill the crucible beforehand with a small quantity of the mixture, then to ignite the same and gradually add further quantities. When the whole mass is in reaction, the molten alumina floating above the iron is cast into the form *f f'*. This alumina-slag congeals at once upon the cold surfaces of the rails and the bottom as well as the side walls of the mold and forms coatings *d i*, which protect the top part of the rails against getting deformed. The other part of the alumina-slag between the coatings is still liquid, but congeals afterward. Then the iron is cast into the mold *b'* after a hole *o* has been punched through the bottom of the mold *b* and the alumina coating *i*. Evidently the bottom of the mold *b* will not offer great resistance to punching the hole through, since the metal has been heated by the alumina.

As already mentioned, the alumina heats the two parts to be welded together, while the iron forms a fish-rail around the bottom parts of the two rails in order to strengthen the joint. The two rails are pressed together after the molten mass has been cast into the molds and the parts have been heated sufficiently to be welded. According to tests it has been found that one and one-half minutes suffice for heating the rails sufficiently for welding the same.

After the process has been carried out in the above-described way the molds are taken off and the alumina coating is knocked off, so that a rail is obtained, as shown in Fig. 3, in which figure $a^2$ is the fish-rail, and *g* is a knob formed in *o* by the overflowing metal, which knob is afterward also knocked off.

Figure 4:
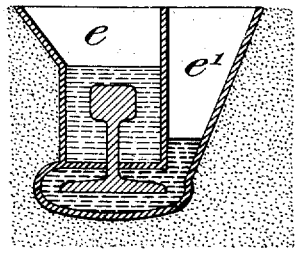

In the modification shown in Fig. 4 two separate openings *e e'* for the alumina and the iron are provided. Through the opening *e* the alumina and through *e'* the molten iron is cast into the molds. The process is carried out in the same way as described above.

Figure 5:
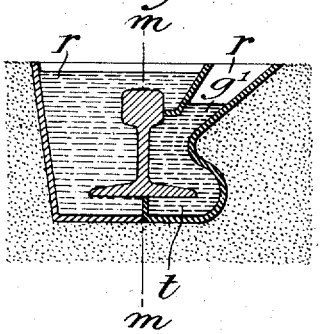

In Fig. 5 a mold is shown consisting of two parts separated in line *m m*, so that on one side *r* of the rails the alumina and on the other side *r'* of the rails the iron is cast. The fish-rail *t* would be arranged in this case only on one side of the rails and would extend to a certain height *g'*.

The process may be carried out also in another way. The top mold in Fig. 1 might be enlarged so as to receive the whole mass, consisting of the molten alumina and the iron. Then a hole is punched through the bottom of the mold, whereby the molten iron flows through this hole around the lower part of the rails.

Figure 6:
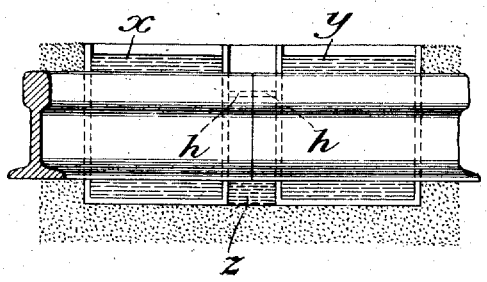

Another form of arrangement is shown in Fig. 6, in which the two molds are not arranged one above the other, but one mold *x* at the side of the other one *y*, the molds not touching each other, but being perfectly separated and leaving a space of about one-half inch between the same. Into this free space *z* between the two molds the molten iron is cast up to a certain height *h*, whereas in the two molds the liquid alumina is cast. The heating of the welding face will be obtained by the conduction of the heat transferred to the rails by the alumina.

Figure 7:
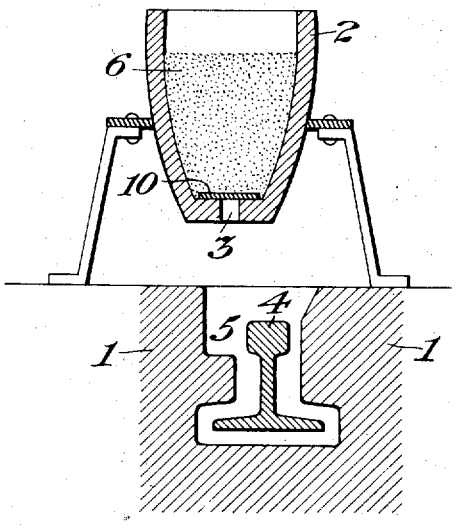
Figure 8:
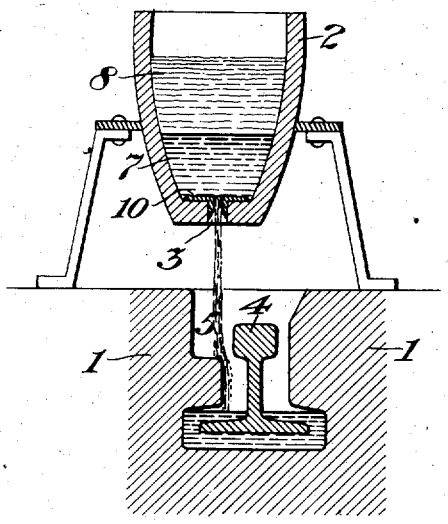
Figure 9:
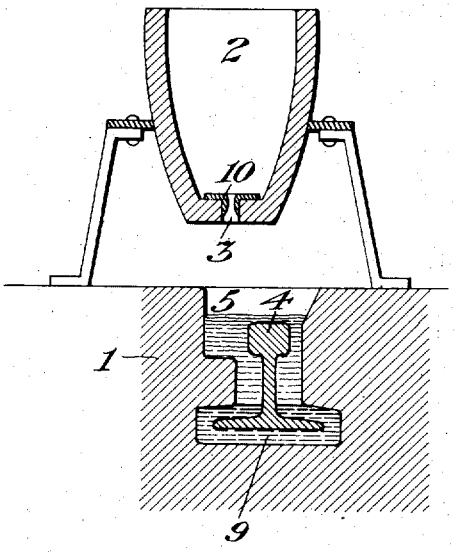
Figure 10:
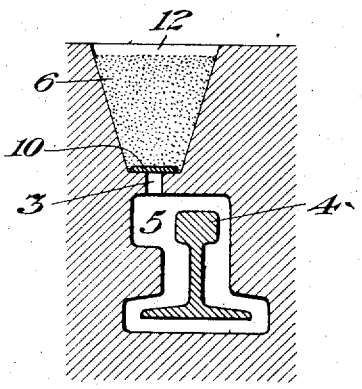

The most practical form of carrying the process into effect is illustrated in Figs. 7, 8, and 9. In these figures 1 is a mold. 2 is a crucible situated above the same and provided with a tap-hole 3, which tap-hole may be closed by means of a plug or, as shown in the drawings, by means of a plate 10, consisting of sheet-iron or the like. 6 is the reaction mass. 4 are the rails to be joined. As will be seen from the drawings, the crucible is situated so that the tap-hole 3 is not situated vertically above the head of the rail. If the reaction mass 6 is ignited, the highly overheated metal 7, Fig. 8, melts the plate 10 and flows into the space 5 of the mold 1 and from there around the foot of the rail, as may be seen from the drawings, the alumina 8 flowing out after the metal flows around the upper part of the rail, as will be seen from 9. It will be understood that instead of arranging a special crucible above the mold this mold may be provided with a funnel 12 on its top, in which funnel the mixture can be filled.

Contrary to the known process consisting in casting metals around the lower part of the rails by the process described above a better welding or joining of the metal cast around the rail-foot with this rail-foot is attained by the high superheat of the metal, whereby it is attained that the joining faces are joined in such a way that one continuous metal piece is formed.

Having thus fully described the nature of my said invention, what I desire to secure by Letters Patent of the United States is—

1. Process of joining metals by means of the heat arising by the reaction taking place when pulverized aluminium and reducible oxygen-containing metal compounds are mixed and this mixture is ignited, said process consisting in casting the highly-overheated molten metal arising by the reaction directly around one part of the metal pieces to be joined, and the molten alumina around another part of these metal pieces, substantially as described and for the purpose set forth.

2. Process of joining metal pieces consisting in surrounding the ends to be joined with a mold, filling a crucible provided with a tap-hole in the bottom with a mixture consisting of aluminium and a reducible oxygen-containing metal compound, bringing the crucible above the mold in that way that the tap-hole is not situated vertically above the parts to be joined, igniting the mixture contained in the crucible and opening the tap-hole of the same, substantially as described and for the purpose set forth.

3. Process of joining metal pieces consisting in surrounding the ends to be joined with a mold, filling a crucible provided with a tap-hole in the bottom with a mixture consisting of aluminium and a reducible oxygen-containing metal compound, after the tap-hole being closed by means of a substance capable of being molten by the heat arising by the reaction taking place by the ignition of the mixture mentioned above, bringing the crucible above the mold in that way that the tap-hole is not situated vertically above the metal pieces to be joined and igniting the mixture contained in the crucible, substantially as described and for the purpose set forth.

4. A process of welding metal which consists in igniting in a crucible a mixture of a reducible metallic compound and aluminium and causing the molten metal to discharge from the crucible into contact with a metal part in advance of the molten slag.

In testimony whereof I have signed my name to this specification in the presence of two subscribing witnesses.

HANS GOLDSCHMIDT.

Witnesses:
WOLDEMAR HAUPT,
HENRY HASPER.